United States Patent
Boughner et al.

(10) Patent No.: US 9,090,221 B2
(45) Date of Patent: Jul. 28, 2015

(54) ONE-WAY LOCKING LINEAR PRETENSIONER

(71) Applicant: Autoliv ASP, Inc., Ogden, UT (US)

(72) Inventors: Jonathon Boughner, Lake Orion, MI (US); Robert E. Ver Hoven, Harsens Islands, MI (US); Mark Gray, Macomb, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/210,857

(22) Filed: Mar. 14, 2014

(65) Prior Publication Data

US 2014/0265291 A1 Sep. 18, 2014

Related U.S. Application Data

(60) Provisional application No. 61/794,134, filed on Mar. 15, 2013.

(51) Int. Cl.
*B60R 22/195* (2006.01)

(52) U.S. Cl.
CPC .................................. *B60R 22/1955* (2013.01)

(58) Field of Classification Search
USPC .......... 280/806, 807; 297/478, 479, 480, 476; 411/127, 113, 114
See application file for complete search history.

(56) References Cited

U.S. PATENT DOCUMENTS

| 5,924,730 | A | * | 7/1999 | Burrow et al. | 280/806 |
| 6,068,664 | A | | 5/2000 | Meyer et al. | |
| 6,145,881 | A | * | 11/2000 | Miller et al. | 280/806 |
| 6,394,248 | B1 | * | 5/2002 | Monahan et al. | 192/41 S |
| 6,679,446 | B2 | * | 1/2004 | Bell et al. | 242/374 |
| 6,871,877 | B2 | * | 3/2005 | Herrmann et al. | 280/805 |
| 7,188,868 | B2 | * | 3/2007 | Yamaguchi | 280/806 |
| 7,207,762 | B2 | * | 4/2007 | Teal | 411/526 |
| 7,261,506 | B2 | * | 8/2007 | Smolarek | 411/161 |
| 7,380,832 | B2 | * | 6/2008 | Gray et al. | 280/806 |
| 7,641,429 | B2 | * | 1/2010 | DiStasio et al. | 411/127 |
| 7,823,924 | B2 | * | 11/2010 | Dewey et al. | 280/806 |
| 7,878,548 | B2 | * | 2/2011 | Kohama | 280/806 |
| 2008/0053784 | A1 | * | 3/2008 | Davis | 192/41 A |
| 2010/0282889 | A1 | * | 11/2010 | Hjerpe et al. | 242/374 |
| 2013/0193740 | A1 | * | 8/2013 | Brisighella et al. | 297/480 |
| 2013/0193741 | A1 | * | 8/2013 | Cahill et al. | 297/480 |

* cited by examiner

*Primary Examiner* — Ruth Ilan
*Assistant Examiner* — Darlene P Condra
(74) *Attorney, Agent, or Firm* — Brinks Gilson & Lione

(57) ABSTRACT

A one-way locking assembly having an axially moveable member extending through a locking structure. The locking structure including an engagement member contacting an exterior surface of the axially moveable member and being movable relative to the exterior surface of the moveable member in a first direction while being substantially immovable along the outer surface of the moveable member in a direction opposite to the first direction. The engagement member further including a pair of lock arms extending radially inward from a circumferential frame and terminating in distal ends engaging the exterior surface of the moveable member.

16 Claims, 4 Drawing Sheets

ONE-WAY LOCKING LINEAR PRETENSIONER

CROSS REFERENCE TO RELATED APPLICATION

This application claims the benefit of U.S. provisional patent application No. 61/794,134, filed on Mar. 15, 2013, the entire contents of which are herein incorporated by reference.

BACKGROUND

1. Field of the Invention

The present invention generally relates to seatbelt restraint systems for motor vehicles. More particularly, the present invention relates to a locking mechanism for a linear pretensioner of a seatbelt restraint system in a motor vehicle.

2. Related Technology

Seatbelt restraint systems used for restraining occupants in motor vehicle seats play an important role in reducing injury to the occupants in the unfortunate event of a vehicle crash. While there are several varieties of seatbelt restraint systems, the conventional "3-point" variety has a lap belt section extending across the pelvis and a shoulder belt section crossing the upper torso of a seated occupant. The lap and shoulder belt sections are each connected to the vehicle structure by anchorages and may be further fastened to each other or formed as portions of a continuous length of seatbelt webbing. Seatbelt restraint systems that are manually secured by the occupant ("active" types) also typically include a latch plate attached to the belt webbing. Such a system further includes a seatbelt buckle attached to the vehicle body structure by another anchorage. The latch plate is received by the buckle thereby allowing the seatbelt restraint system to be fastened, enabling restraint, and unfastened, allowing entrance and exit from the vehicle. Of the anchorages securing the lap and shoulder belt sections, one anchorage typically includes a belt retractor to store the belt webbing. This belt retractor may further act to manage belt tension loads during a crash situation. Seatbelt restraint systems, when deployed, effectively restrain the occupant during a collision.

OEM (Original Equipment Manufacturer) vehicle manufacturers often provide seatbelt restraint systems with pretensioning devices (usually referred to just as a "pretensioner"). These devices induce tension in the seatbelt, either prior to impact of the vehicle during a collision or at an early stage of a sensed impact/collision, so as to enhance occupant restraint performance. This pretensioning takes slack out of the webbing and permits the seatbelt restraint system to engage the occupant earlier in the crash sequence.

One class of pretensioning devices is a pyrotechnic linear pretensioner (PLP). A PLP can be implemented as a pyrotechnic buckle pretensioner (PBP) that is attached to and activated through the seatbelt buckle. In other implementations, the PLP can be attached to a webbing guide loop, either anchorage connected to the opposing ends of the seatbelt webbing or directly to the webbing itself. Since all of the above types of pretensioners linearly pull a seatbelt system component to induce tension in the seatbelt webbing, they are collectively referred to as PLPs.

When a collision occurs, a pyrotechnic charge in the PLP is fired, producing an expanding gas that pressurizes a gas chamber. This pressure forces a piston to move. The piston is connected with the belt system by a cable, a strap or the webbing of the restrain system, and the stroking of the piston tightens or "pretensions" the belt against the occupant. Various examples of PLP and PBP designs are provided in U.S. Pat. Nos. 6,068,664 and 7,823,924, which are hereby incorporated by reference.

Designers of automotive components are constantly striving to reduce the mass of the components as part of the overall goal of providing higher fuel efficiency for motor vehicles. Additionally, these same designers are also constantly striving to reduce costs in automotive components. One way to achieve the above is to reduce packaging or sizing of components.

In accordance with one known design approach, the PLP includes a machined or die cast piston that is sealingly coupled to a tubular combustion cylinder. When activated, relative movement between the combustion cylinder and the piston occurs, with the combustion cylinder being extended out of the piston. The belt webbing is wound around an actuating profile defined on an end of the combustion cylinder, opposite of the piston, such that the length of the belt webbing is shortened by a distance corresponding to twice the distance of the mechanism's stroke. This doubling of the effect of the mechanism's stroke on the belt webbing enables the overall length of the PLP packaging to be shortened.

As the occupant begins to load the seatbelt webbing during an impact, the forces urge the reverse movement of the combustion cylinder relative to the piston, in other words the cylinder is urged back into the piston. Such a reversal of the relative movement of the piston and combustion cylinder is undesirable since it induces slack in the belt webbing and increases the momentum and movement of the occupant and, therefore, the potential risk to the occupant.

A method of limiting this reversal of movement is to provide a one-way clutch assembly associated with the piston assembly. One style of a one-way clutch includes conical and annular portions of the piston head as part of the clutch. In such a system, the piston is movable within a combustion cylinder and the components forming the clutch are located between a pair of piston heads traversing within that cylinder. Movement in the playback direction wedges BBs, retained between the heads of the piston, between the conical portion and the inner surface of the combustion cylinder. This wedging of the BBs results in locking of the piston.

The construction of the above system is complex and labor-intensive during manufacturing. A simplify construction for the one-way clutch would be beneficial in that it would reduce weight and packaging requirements as well as reduce labor intensity during manufacturing.

SUMMARY

In satisfying the above needs, as well as overcoming the enumerated drawbacks and other limitations of the related art, in one aspect the present invention provides a pretensioner for a motor vehicle belt restraint system having a base plate defining a length and a combustion sub-assembly fixedly mounted to the base plate. The sub-assembly includes a combustion cylinder and a combustion housing, the latter of which defines a combustion chamber and retains a gas generator in communication with the combustion chamber. The combustion cylinder extends from the combustion housing in a direction along the length of the base plate. An interior passageway of the cylinder is in fluid communication with the combustion chamber, whereby an expanding gas generated by the gas generator is transmitted through the interior passageway of the combustion cylinder. A piston is movably mounted to the base plate and has closed ended bore within which at least a portion of the combustion cylinder is received. The closed ended bore is in fluid communication with the interior passageway of the combustion cylinder, and the piston is movable along the combustion cylinder in response to generation of the expanding gas. A one-way locking structure is supported by the piston and movable therewith. The locking structure includes an engagement member contacting an exterior surface of the combustion cylinder. The engagement member is movable along the exterior surface of the combustion cylinder in a first direction and is substantially immovable along the outer surface of the combustion cylinder in a direction opposite to the first direction.

In another aspect of the invention, the engagement member is one of a deflectable arm or a BB.

An additional aspect of the invention, the one-way locking structure is disposed about the combustion cylinder.

In a further aspect of the invention, the one-way locking structure is of a one-piece construction.

In yet another aspect of the invention, the one-way locking structure is planar.

In still a further aspect of the invention, the one-way locking structure includes a frame defining a perimeter of the one-way locking structure, a pair of opposed lock arms extending radially inward from the frame.

In an additional aspect of the invention, the one-way locking structure includes a lock piece having a pair of lock arms extending radially inward and terminating in distal ends engaging the outer surface of the combustion cylinder.

In another aspect of the invention, the distal ends of the lock arms define semicircular end faces.

In yet another aspect of the invention, each of the semicircular end faces defines an included angle that is less than 180°.

In a further aspect of the invention, the end faces are obliquely oriented with respect to a plane defined by the lock arms.

An additional aspect of the invention, the lock arms are obliquely oriented with respect to the combustion cylinder.

In still another aspect of the invention, the lock arms are disposed in the direction toward the combustion housing.

In a further aspect of the invention, the one-way lock structure includes a collar disposed about the combustion cylinder, the collar further having a passageway defined therethrough the passageway being formed by a conical surface.

In a still further aspect of the invention, a series of BBs are disposed between the conical surface of the collar and the exterior surface of the combustion cylinder.

An additional aspect of the invention, the conical surface is narrower on a side of the collar adjacent to the piston and is wider on a side of the collar located toward the combustion housing.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION

A representative seatbelt restraint system that may be used with a pretensioner incorporating principles of the present invention generally includes a seatbelt that is mounted to a body structure of the motor vehicle. One end of the seatbelt is preferably connected to a retractor that operates to retract the seatbelt, both when in use and when not in use. The seatbelt includes a lap belt section and a shoulder belt section. The lap belt section, when deployed, extends across the pelvic region of an occupant sitting on the seat of the motor vehicle. The shoulder belt section extends laterally across the upper torso region of the occupant. The lap belt section and the shoulder belt section may be joined together at a respective end of each section or be provided as portions of continuous seatbelt webbing.

Provided on the seatbelt is a latch plate, which may be slidable along at least a portion of the length of the seatbelt. When the seatbelt is deployed, the latch plate generally defines the transition between the lap belt section and the shoulder belt section.

The seatbelt restraint system also includes a buckle located relative to one side of the seat. Like the seatbelt, the buckle is secured to a body structure of the vehicle. The previously mentioned latch plate is removably secured within the buckle, such that when the latch plate is engaged with the buckle, the retractor provides for retraction of the seatbelt gently against the body of the occupant. When the latch plate is released from the buckle, the retractor provides for full retraction of the seatbelt so that the seatbelt will not inhibit the ingress and egress of the occupant into and out of the vehicle.

To assist in controlling movement of the seatbelt, a guide loop is usually fixed to a vehicle door pillar, such as the B-pillar, or to the seat at approximately the shoulder height of the occupant. In some installations, the position of the guide loop may be vertically adjustable. The guide loop thus positions shoulder belt section diagonally across the torso, the shoulder, chest and abdomen, of a seated occupant and redirects it back toward the retractor.

Figure 1:
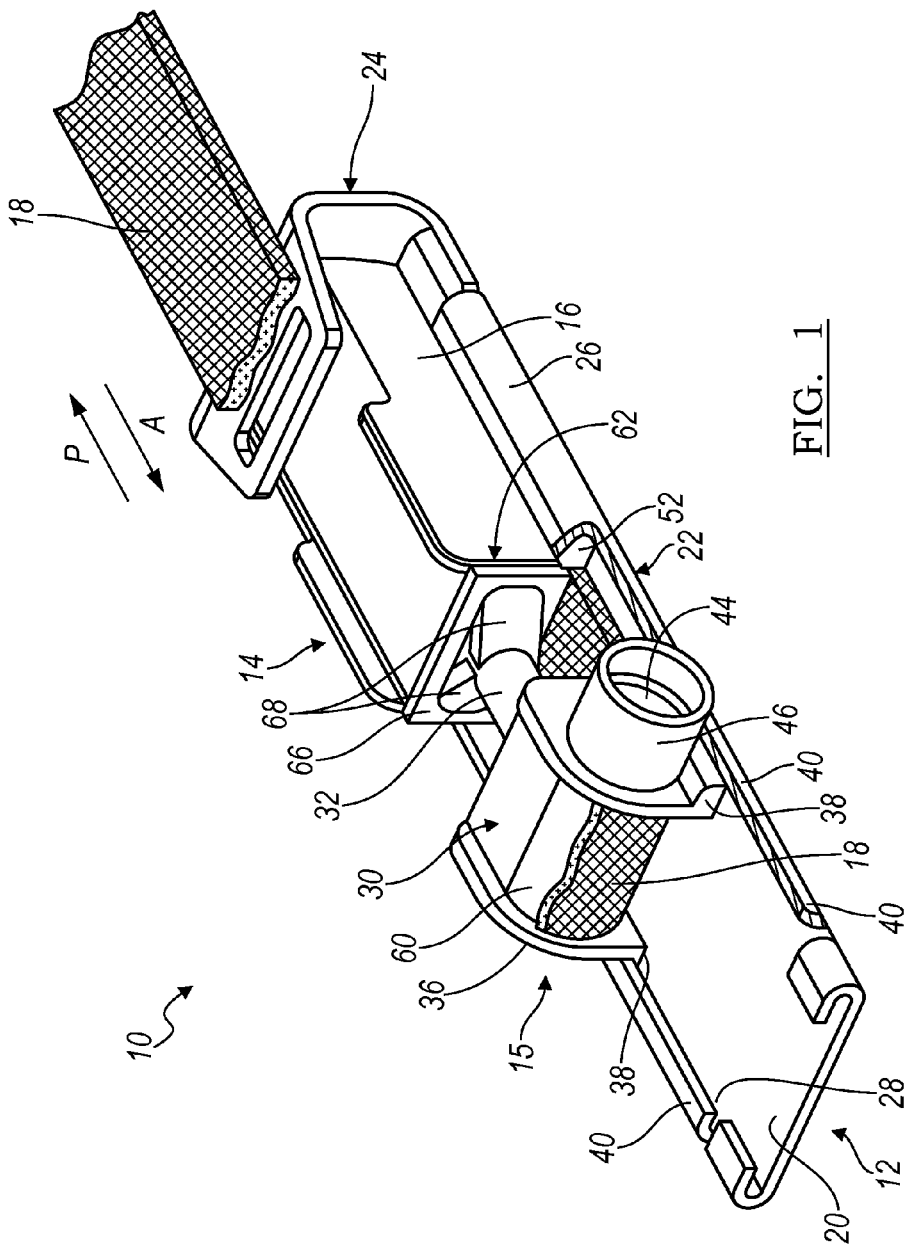
FIG. 1 is perspective view of a pretensioner, in accordance with the principles of the present invention, showing the pretensioner in a pre-activation position.
Figure 2:
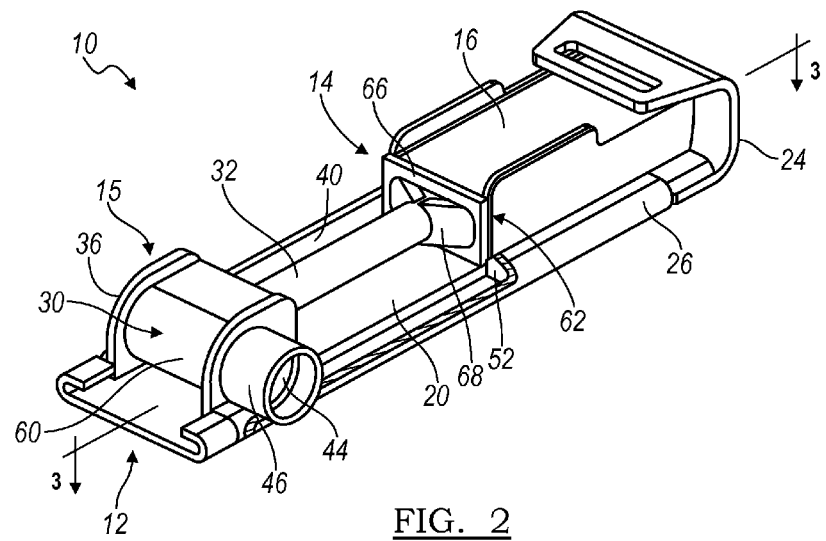
FIG. 2 is perspective view of the pretensioner seen in FIG. 1, with the seatbelt webbing removed and showing the piston in a post-activation position.

The seatbelt restraint system also includes a linear pretensioner, which is illustrated in FIG. 1 and generally designated at 10. As its primary components, the linear pretensioner 10 includes a frame 12, and a pyrotechnically driven piston assembly 14, which includes a combustion sub-assembly 15 and a piston or reaction housing 16. By way of the present invention, the piston assembly 14 interacts with the seatbelt webbing 18 of the seatbelt restraint system to induce tension in the webbing 18, thereby reducing the momentum that can be generated by an occupant during an impact or crash.

The frame 12 of the pretensioner 10 has a base plate 20 formed of sheet metal with a profile that is L-shaped, the L-shape having a long leg 22 extending in the axial direction and a short leg 24 extending in a transverse direction to the long leg 22 at one end. Extending along the length of the long leg 22, generally perpendicularly thereto, and along the length thereof, is a pair of opposed rolled or bent side walls 26. The sidewalls 26 are used as securements for the reaction housing 16, which is further discussed below.

The combustion sub-assembly 15 includes a combustion head 30 and a combustion cylinder 32, both of which are slideably mounted to the frame 12. While the combustion head 30 and the combustion cylinder 32 are slideably mounted to the frame 12, the reaction housing 16 is fixedly mounted to the frame 12. The reaction housing 16 and the combustion head/cylinder 30, 32 are thus moveable relative to one another.

The combustion head 30 is retained to and supported by a pair of end flanges 36 having feet 38 located at lower sides thereof. To secure the flanges 36 and, therefore, the combustion head 30 to the frame 12, the feet 38 are retainingly engaged between a pair of opposed or rolled side walls 40, which like the side walls 26, extend upwardly from the lateral sides of the base plate 20. The side walls 40, however, define a race 28 that retains the feet 38, but does not fixedly secure them to the base plate 20. The feet 38 are therefore free to slide along the side walls 40 and within the race 28. As seen in FIG. 1, one of the rolled side walls 40, the lower side wall 40 in the figure, is shown cut-away to reveal one of the feet 38 of the combustion head 30.

Figure 3:
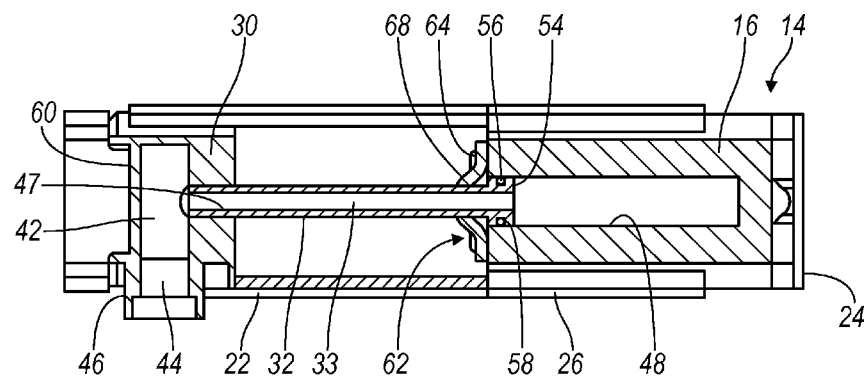
FIG. 3 is a sectional view, generally taken along line 3-3, of the pretensioner seen in FIG. 2.

Between the end flanges 36, the body of the combustion head 30 internally defines a combustion chamber 42 (shown in FIG. 3), and coupled to the combustion chamber 42 is a micro-gas generator 44. Since micro-gas generators are well known in the field of pretensioners, further details on the construction and operation of the micro-gas generator 44 are omitted herein. While the micro-gas generator 44 may be coupled to the combustion chamber 42 in a variety of ways, as illustrated it is provided within a tubular extension 46, extending from the body of the combustion head 30, laterally through or from one of the end flanges 36.

The combustion cylinder 32 is fixedly mounted to the combustion head 30 by way of a bore 47. The bore 47 extends through the combustion head 30 and provides a means by which a combustion passageway 33, defined within the combustion cylinder 32, communicates with the combustion chamber 42.

The combustion cylinder 32 extends from the combustion head 30 generally axially along the frame 12 and is supported at one end by the combustion head 30 and at its opposing end by the reaction housing 16, within which it is slidingly received. To facilitate receiving of the end of the combustion cylinder 32 within the reaction housing 16, the reaction housing 16 includes an internal bore 48.

In its pre-activated state, the reaction housing 16 is located adjacent to the combustion head 30, and the combustion cylinder 32 is substantially completely received within the bore 48 of the reaction housing 16. During activation, a firing signal is provided to the micro-gas generator 44 by way of firing leads (not shown). In response to the firing signal, the micro-gas generator 44 ignites and an expanding gas is released into the combustion chamber 42. From the combustion chamber, the expanding gas proceeds through the passageway 33 of the combustion cylinder 32 and into the internal bore 48 of the reaction housing 16. As previously noted, the reaction housing 16 is fixedly secured to the frame 12. To facilitate this securement to the frame 12, the reaction housing 16 may have feet 52 formed on its lateral lower sides that are received beneath the rolled over portion of the side wall 26 and clamped or compressively engaged between the sidewalls 26 of the base plate 20.

As the expanding combustion gas enters into the internal bore 48 of the reaction housing 16, the gas exerts a force urging the combustion head 30 to move away from the reaction housing 16, away from the short end 24 of the frame 12. To prevent combustion gas from escaping or leaking out of the internal bore 48 of the reaction housing 16 past the combustion cylinder 32, the end of the combustion cylinder 32 is formed with a sealing head 54, which may include an elastomeric seal 56, such as an O-ring, received within an annular groove 58. In this regard, attention is directed to the construction shown in FIG. 3.

The pretensioner 10 induces tension in the seatbelt webbing 18 because an end of the seatbelt webbing 18 is extended about an activation profile 60 defined at the end of the combustion head 30. The activation profile 60 redirects the seatbelt webbing 18 by an angle in the range of 160° to 180°, nearly in an opposite direction from which it was received. The end of the webbing 18 is thereafter secured to the base plate 20 of the frame 12. By extending the seatbelt webbing 18 around the activation profile 60, the distance that the seatbelt webbing 18 is moved during activation of the reaction housing 16 is effectively two times the maximum stroke length of the combustion head 30. With this doubling effect, the pretensioner 10 is able to have a reduced overall length. The positioning of the seatbelt webbing 18 about the activation profile 60 of the combustion head 30 is shown in FIG. 1, wherein portions of the seatbelt webbing 18 are partially cut-away to reveal additional components of the pretensioner 10.

The movement of the combustion head 30 under the urging of the expanding combustion gas is opposed by a pulling force P or resistance exerted by the seatbelt webbing 18. At some point, the opposing force on the combustion head 30 may be strong enough that the combustion head 30 is unable to further pull the webbing 18 in the activation direction A. As the occupant begins to load the seatbelt webbing 18 during a collision, the pulling force P will urge the combustion head 30 to move in a direction opposite of the activation direction A, which is herein referred to as the playback direction. To prevent this, the pretensioner 10 includes a lock piece 62 that is actuated upon movement of the combustion head 30, and more specifically the combustion cylinder 32, in the playback direction.

The lock piece 62 is mounted to an end face 64 of the reaction housing 16 that is generally positioned opposite of the combustion head 30. Mounting of the lock piece 62 to the end face 64 can be achieved by any known means including mechanical fastening or adhesive fastening thereto. Operation of the lock piece 62 utilizes the combustion cylinder 32 as a lock bar and prevents back driving of the combustion head 30 towards the reaction housing 16.

Figure 4:
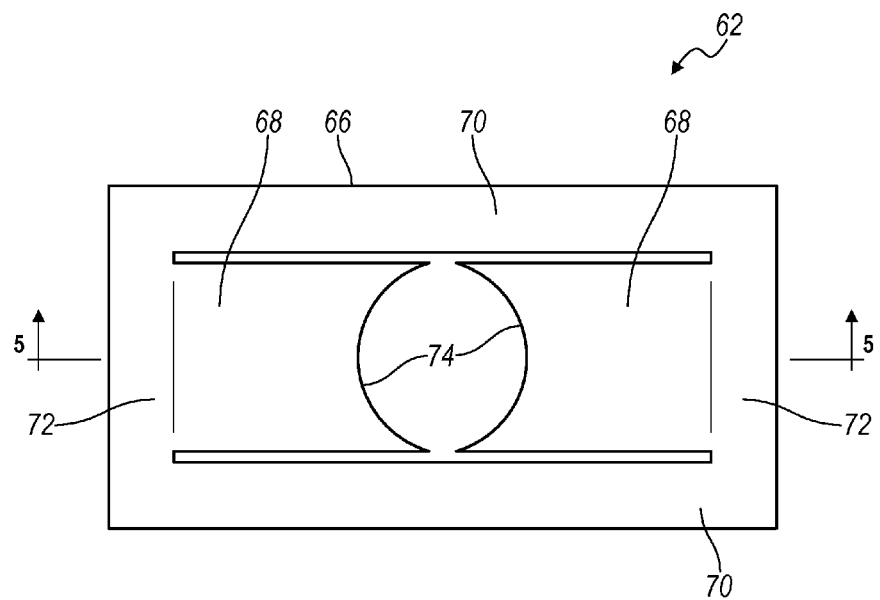
FIG. 4 is a plan view of one embodiment of a lock piece utilized in connection with the pretensioner seen in FIGS. 1-3.
Figure 5:
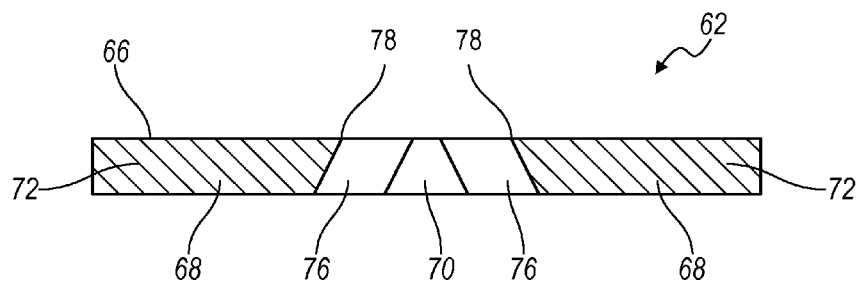
FIG. 5 is a cross-sectional view, generally taken along line 5-5, of the lock piece seen in FIG. 4.

Referring now to FIGS. 4 and 5, the lock piece 62 is generally a planar structure having a frame 66 within which are provided a pair of opposed locking arms 68. The frame 66 has a rectangular shape that is dimensioned to correspond with the shape of the end face 64 of the reaction housing 16. While shown as corresponding in size and shape to the end face 64 the reaction housing 16, the frame 66 and the lock piece 62 may exhibit a size/shape that is larger or smaller and different than the end face 64, so long as the lock piece 62 does not interfere with movement of the combustion cylinder 32 and combustion housing 30 in the activation direction A.

The frame 66 includes longitudinal parts 70 between which extend lateral end parts 72. The locking arms 68 are provided between the longitudinal parts 70 and extend toward one another from the end parts 72 and terminate at distal ends 74, which are provided with a semicircular shape that corresponds in part with the outer surface of the combustion cylinder 32. The length of the lock arms 68 from the end parts 72 to the distal ends 74 is greater than the length from the end parts 72 to the outer surface of the combustion cylinder 32. For this reason, the semicircular shape of the distal ends 74 forms less than a full half-circle and the lock arms 68 engage the combustion cylinder 32 at an oblique angle. More specifically, when contacting the outer surface of the combustion cylinder, the lock arms 68 are generally disposed toward the combustion head 30. Additionally, the end faces 76 are oblique to the plane of the lock arms 68, as best seen in FIG. 5. The oblique orientation of the end faces 76 allows the end faces 76 to be positioned in surface-to-surface contact with the outer surface of the combustion cylinder 32 when the combustion cylinder 32 is position between the lock arms 6, due to the oblique angle of the lock arms 68 relative to the cylinder 32. The oblique orientation of the end faces 76 also defines a trailing edge 78 on the lock arms 68, the purpose of which is further discussed below.

After activation of the pretensioner 10, if the combustion head 30 and combustion cylinder 32 are urged in the playback direction, the length of the lock arms 68 cause the lock arms 68 to be compressively loaded and drives the trailing edges 78 into the outer surface of the combustion cylinder 32. This engagement of the trailing edges 78 with the exterior surface of the combustion cylinder 32 locks the lock piece 62 with the combustion cylinder 32 and prevents the combustion head 30 from further moving in the playback direction.

Figure 6:
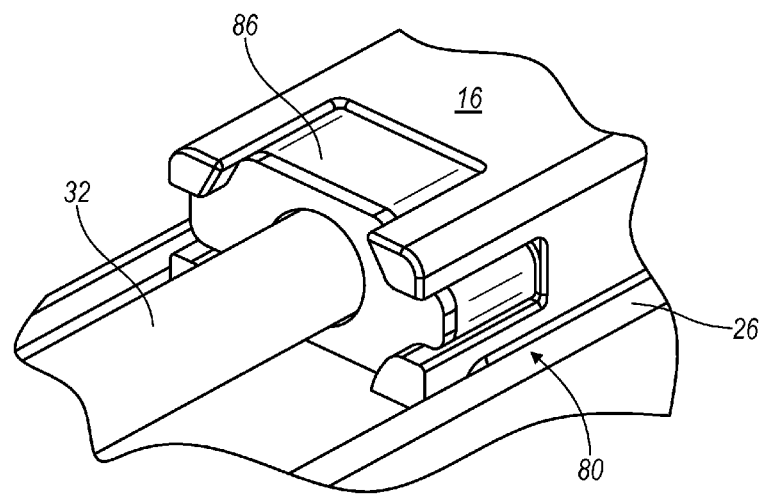
FIG. 6 is an enlarged perspective view of an alternative one-way clutch assembly incorporated into a pretensioner in accordance with the principles of the present invention.
Figure 7:
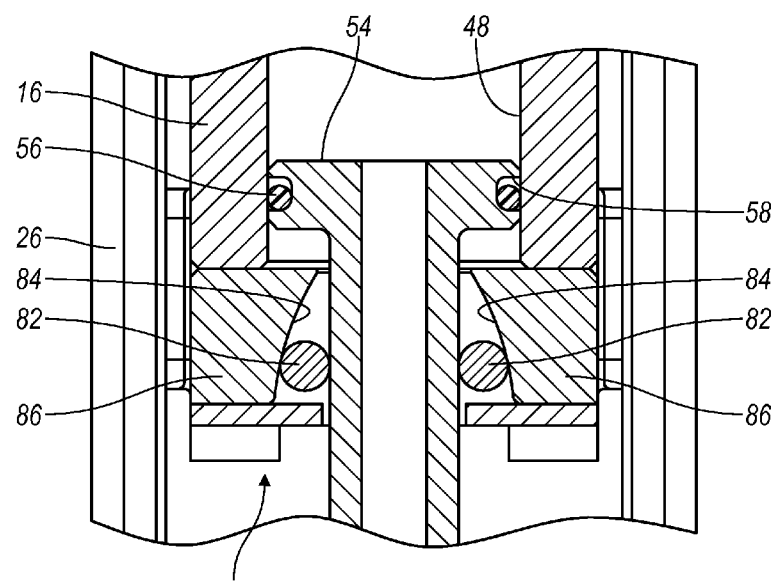
FIG. 7 is a partial sectional view through FIG. 6 illustrating the working details of the one-way clutch assembly shown therein.

A second embodiment for locking the reaction housing 16 to the combustion cylinder 32, upon the occurrence of movement in the playback direction, is illustrated in FIGS. 6 and 7. In this embodiment, the lock piece 62 is replaced with a one-way clutch assembly 80 that includes a series of roller balls or BBs 82 provided about the annular surface of the combustion cylinder 32. Located outwardly of the BBs 82 is a conical surface 84 that is defined by inner surfaces of a lock collar 86. The conical surface 84 is provided such that the narrower end of the surface 84 is disposed towards the reaction housing 16. The wide end of the conical surface 84 is therefore disposed away from the reaction housing 16 and toward the combustion head 30.

The BBs 82 are dimensioned so that as the combustion cylinder 32 and combustion head 30 are moved in the activation direction A, the BBs 82 freely roll along the outer surface of the combustion cylinder 32. Upon urging of the combustion head 30, and the combustion cylinder 32, in the playback direction, the BBs 82 are caused to roll along the conical surface 84 toward the narrower side thereof, in the direction of the reaction housing 16. As a result, the BBs 82 eventually become wedged between the conical surface 84 and the annular outer surface of the combustion cylinder 32. This wedging action of the BBs 82 prevents any further movement of the combustion cylinder 32 and combustion head 30 in the playback direction, thereby locking the pretensioner 10.

While the above description constitutes the preferred embodiment of the present invention, it will be appreciated that the invention is susceptible to modification, variation, and change without departing from the proper scope and fair meaning of the accompanying claims.

We claim:

1. A pretensioner for use as part of a motor vehicle belt restraint system, the belt restraint system being of the type mountable to a structure of the motor vehicle and acting on a seatbelt, the pretensioner comprising:
a base plate defining a length;
a combustion sub-assembly moveably mounted to the base plate and further including a combustion head defining a combustion chamber, a gas generator in communication with the combustion chamber, the combustion subassembly also including combustion cylinder extending from the combustion head in a direction along the length of the base plate, the combustion cylinder defining an interior passageway in communication with the combustion chamber whereby an expanding gas generated by the gas generator in the combustion chamber is transmitted through the interior passageway of the combustion cylinder;
a reaction housing fixedly mounted to the base plate, the reaction housing having an interior closed ended bore within which is received at least a portion of the combustion cylinder, the closed ended bore being in fluid communication with the interior passageway of the combustion cylinder, and the combustion cylinder being axially movable within the closed ended bore in response to generating of the expanding gas; and
a one-way locking structure supported by the reaction housing and fixed therewith, the locking structure including an engagement member contacting an exterior surface of the combustion cylinder, the engagement member being movable relative to the exterior surface of the combustion cylinder in a first direction and being substantially immovable relative to the exterior surface of the combustion cylinder in a direction opposite to the first direction.

2. The pretensioner according to claim 1, wherein the engagement member is one of a deflectable arm or a BB.

3. The pretensioner according to claim 1, wherein the one-way locking structure is disposed about the combustion cylinder.

4. The pretensioner according to claim 1, wherein the one-way locking structure is of a one-piece construction.

5. The pretensioner according to claim 4, wherein the one-way locking structure is planar.

6. The pretension or according to claim 4, wherein the one-way locking structure includes a pair of opposed lock arms extending radially inward toward the combustion cylinder.

7. The pretensioner according to claim 1, wherein the one-way locking structure includes a pair of lock arms extending radially inward from a circumferential frame, the lock arms terminating in distal ends engaging the exterior surface of the combustion cylinder.

8. The pretensioner according to claim 7 wherein the distal ends of the lock arms define semicircular end faces.

9. The pretensioner according to claim 8, wherein each of the semicircular end faces defines an included angle of less than 180°.

10. The pretensioner according to claim 8, wherein the end faces are obliquely oriented with respect to a plane defined by the lock arms.

11. The pretensioner according to claim 7, wherein the lock arms are obliquely oriented with respect to a central axis of the combustion cylinder.

12. The pretensioner according to claim 11, wherein the lock arms are disposed in the direction toward the combustion head.

13. The pretensioner according to claim 1, wherein the one-way lock structure includes a collar having a conical passageway defined therethrough, the collar being disposed about the combustion cylinder with the combustion cylinder extending through the conical passageway.

14. The pretensioner according to claim 13, wherein a series of BBs are disposed between the conical passageway and the exterior surface of the combustion cylinder.

15. The pretensioner according to claim 14 wherein the conical surface is narrower on a side of the collar adjacent to the reaction housing and is wider on a side of the collar located toward the combustion head.

16. A one-way locking assembly comprising:
an axially moveable member extending through a locking structure, the locking structure including an engagement member contacting an exterior surface of the axially moveable member, the engagement member being movable relative to the exterior surface of the moveable member in a first direction and being substantially immovable along the outer surface of the moveable member in a direction opposite to the first direction, the engagement member including a pair of lock arms extending radially inward from a circumferential frame and terminating in distal ends engaging the exterior surface of the moveable member, the distal ends defining semicircular end faces that engage the axially moveable member and the lock arms being obliquely oriented with respect to a central axis of the moveable member.

* * * * *